(12) United States Patent
Sasaki et al.

(10) Patent No.: US 11,801,560 B2
(45) Date of Patent: Oct. 31, 2023

(54) CUTTING INSERT

(71) Applicant: TUNGALOY CORPORATION, Fukushima (JP)

(72) Inventors: Yasutake Sasaki, Iwaki (JP); Ryuichi Saji, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/716,013

(22) Filed: Apr. 8, 2022

(65) Prior Publication Data

US 2022/0388071 A1 Dec. 8, 2022

(30) Foreign Application Priority Data

Jun. 3, 2021 (JP) ................................ 2021-093779

(51) Int. Cl.
*B23B 27/18* (2006.01)
*B23B 27/14* (2006.01)
*B23B 27/04* (2006.01)

(52) U.S. Cl.
CPC ............ *B23B 27/145* (2013.01); *B23B 27/04* (2013.01); *B23B 2200/126* (2013.01); *B23B 2240/08* (2013.01)

(58) Field of Classification Search
CPC ... B23B 27/04; B23B 2240/08; B23B 27/148; B23B 2226/125; B23B 2226/31; B23B 27/145; B23B 27/18; B23B 27/20
See application file for complete search history.

(56) References Cited

U.S. PATENT DOCUMENTS

2005/0183893 A1   8/2005   Sjogren et al.
2007/0207715 A1*  9/2007   Webb ...................... B23P 15/28
                                                        451/540

FOREIGN PATENT DOCUMENTS

| GB | 790805 A | 2/1958 |
| JP | S62-099006 A | 5/1987 |
| JP | H11-333604 A | 12/1999 |
| JP | 2002-028813 A | 1/2002 |
| JP | 2008-521636 A | 6/2008 |
| JP | 2011-167805 A | 9/2011 |

* cited by examiner

*Primary Examiner* — Alan Snyder
(74) *Attorney, Agent, or Firm* — Studebaker & Brackett PC

(57) ABSTRACT

A cutting insert that suppresses softening of joint material in a joint surface between a sintered body and a base body to improve the joint strength, and that enables size reduction of the sintered body, is provided. The cutting insert includes a sintered body having a cutting edge, and a base body having a leading end where the sintered body is joined via a braze material. The sintered body includes a front surface on a leading side, an upper surface connected to the front surface and forming the cutting edge with the front surface along a connecting edge with the front surface, a bottom surface opposite the upper surface, a back surface opposite the front surface, and two side surfaces. The sintered body and base body are joined together in a joint surface including the bottom surface and back surface of the sintered body. The joint surface in side view has a step-like shape with a leading side thereof being lower than a trailing side thereof.

6 Claims, 11 Drawing Sheets

CUTTING INSERT

BACKGROUND ART

Field

The present invention relates to a cutting insert.

Description of Related Art

Cutting inserts for high hardness material machining, for example, for grooving, include a sintered body such as a CBN sintered body, which forms the cutting edge, and which is joined to a base insert (base body) with a braze material. Generally, a sintered body that is substantially cuboidal is brazed to the base body on two surfaces, i.e., bottom and back surfaces (see Patent Publication JP-A-2011-167805).

SUMMARY

The brazing mentioned above entails a risk of the braze material being softened by the heat conducted thereto from the cutting edge part of the sintered body that is heated to a high temperature during machining under high load conditions such as high speed, high feed rate, large entering angle, and dry machining. Softened braze material may cause separation of the sintered body from the base body or lead to fracture of the sintered body.

During machining under high load conditions, the brazed joint of the cutting insert is subjected to a large load, which may lead to fracture of the sintered body. For this reason, enhancement of the brazing strength is desired for the cutting insert of the above type.

The sintered body is expensive. The larger the amount of material used for the sintered body, the more expensive the cutting insert. Therefore, size reduction of the sintered body is desirable.

The present invention has been made in view of these issues, with an object to provide a cutting insert that suppresses softening of joint material such as braze material in a joint surface between a sintered body and a base body to improve the joint strength, and that enables size reduction of the sintered body.

The cutting insert according to one aspect of the present invention includes a sintered body having a cutting edge, and a base body having a leading end where the sintered body is joined to the base body via a braze material. The sintered body includes a front surface on a leading side of the sintered body, an upper surface connected to the front surface with the cutting edge being formed along a connecting edge between the upper surface and the front surface, a bottom surface opposite the upper surface, a back surface opposite the front surface, and two side surfaces connected to the front surface, the upper surface, the bottom surface, and the back surface. The sintered body and the base body are joined together in a joint surface that includes the bottom surface and the back surface of the sintered body. The joint surface in side view has a step-like shape, with a leading side thereof being lower than a trailing side thereof.

According to this aspect, the joint surface between the sintered body and the base body has a step-like shape, because of which the leading side of the joint surface (joint material closer to the front surface of the sintered body), where the temperature becomes relatively high during the cutting by the cutting edge, is located away from the cutting edge. This minimizes the thermal softening of the joint material on the joint surface. The step-like shape also enables an increase in the joint area of the joint surface between the sintered body and the base body, which enhances the joint strength. Moreover, the joint surface is closer to the upper surface of the sintered body on the trailing side so that the sintered body is thinner on the side closer to the back surface. This enables size reduction of the sintered body.

In the above aspect, the joint surface may include a plurality of flat joint surfaces extending from the leading side to the trailing side of the joint surface, and a plurality of erected joint surfaces extending upward, and the flat joint surfaces and the erected joint surfaces may alternate from the leading side to the trailing side of the joint surface.

In the above aspect, the flat joint surfaces in side view may be inclined such that a trailing side thereof is lower than a leading side thereof.

In the above aspect, the plurality of flat joint surfaces may include a first flat joint surface located on the leading side thereof and a second flat joint surface located on the trailing side thereof, and the first flat joint surface may have a length equal to, or longer than, that of the second flat joint surface in a front-back direction.

In the above aspect, the plurality of flat joint surfaces may include a first flat joint surface located on the leading side thereof and a second flat joint surface located on the trailing side thereof, and the second flat joint surface may have a length longer than that of the first flat joint surface.

In the above aspect, the joint surface may include an intermediate joint surface connecting the flat joint surface and the erected joint surface, and the intermediate joint surface in side view may be upwardly convexly curved.

In the above aspect, the sintered body in side view may have a height in the front surface that is 110% or more of a height in the back surface.

In the above aspect, the joint surface in side view may further include a downwardly projecting shape behind the step-like shape.

DETAILED DESCRIPTION

Hereinafter a preferred embodiment of the present invention will be described with reference to the drawings.

Figure 1:
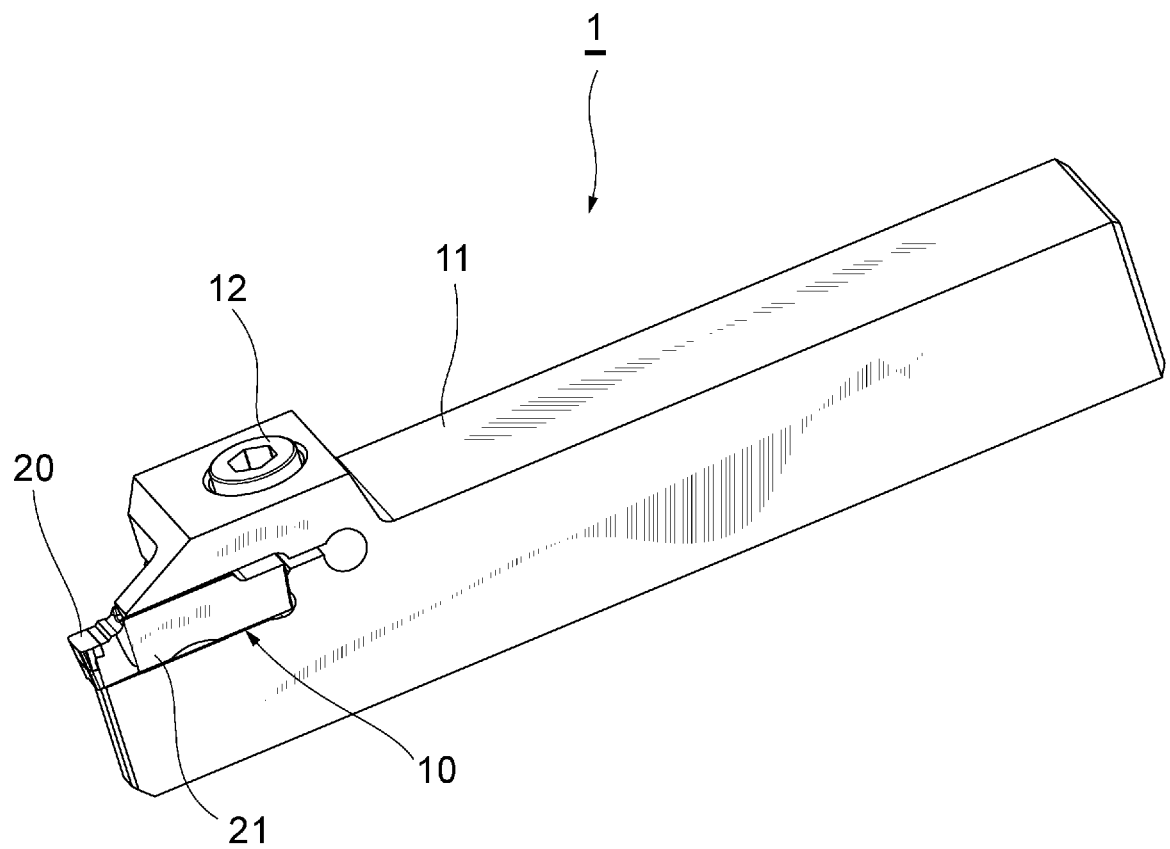
FIG. 1 is a perspective view illustrating an example of a cutting tool according to the embodiment.
Figure 1:
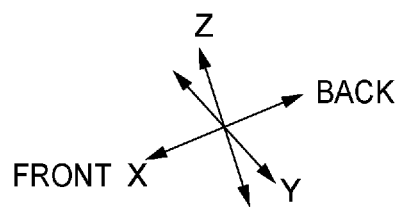

FIG. 1 is a perspective view illustrating an example of a cutting tool 1 holding a cutting insert 10 according to the embodiment.

The cutting tool 1 is for example a grooving tool. The cutting tool 1 includes the cutting insert 10 and a tool body 11 that rigidly holds the cutting insert 10. The cutting insert 10 can be fixedly mounted to the tool body 11 of the cutting tool 1 by fastening a screw 12.

The tool body 11 has an elongated shape and holds the cutting insert 10 at the leading end thereof. The structure or shape of the tool body 11 are not limited to this example.

Figure 2:
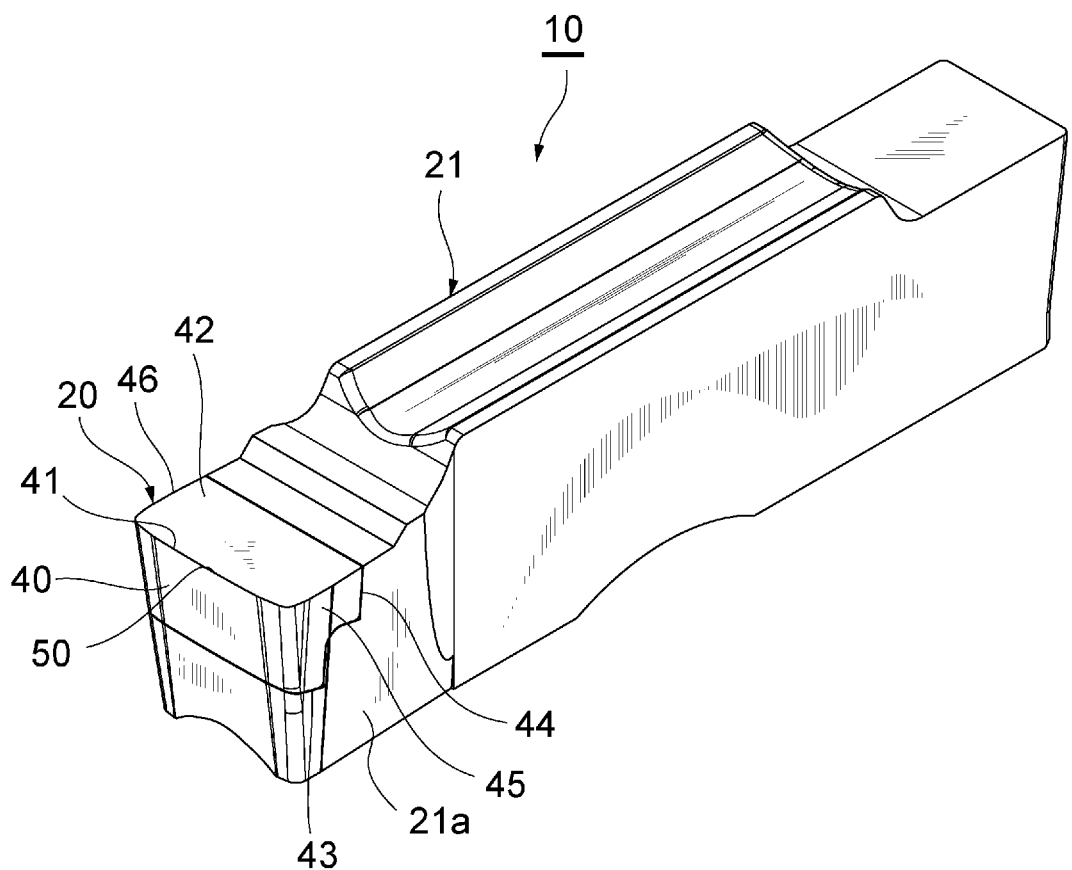
FIG. 2 is a perspective view of a cutting insert according to the embodiment.
Figure 2:
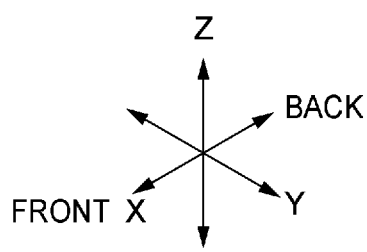
Figure 3:
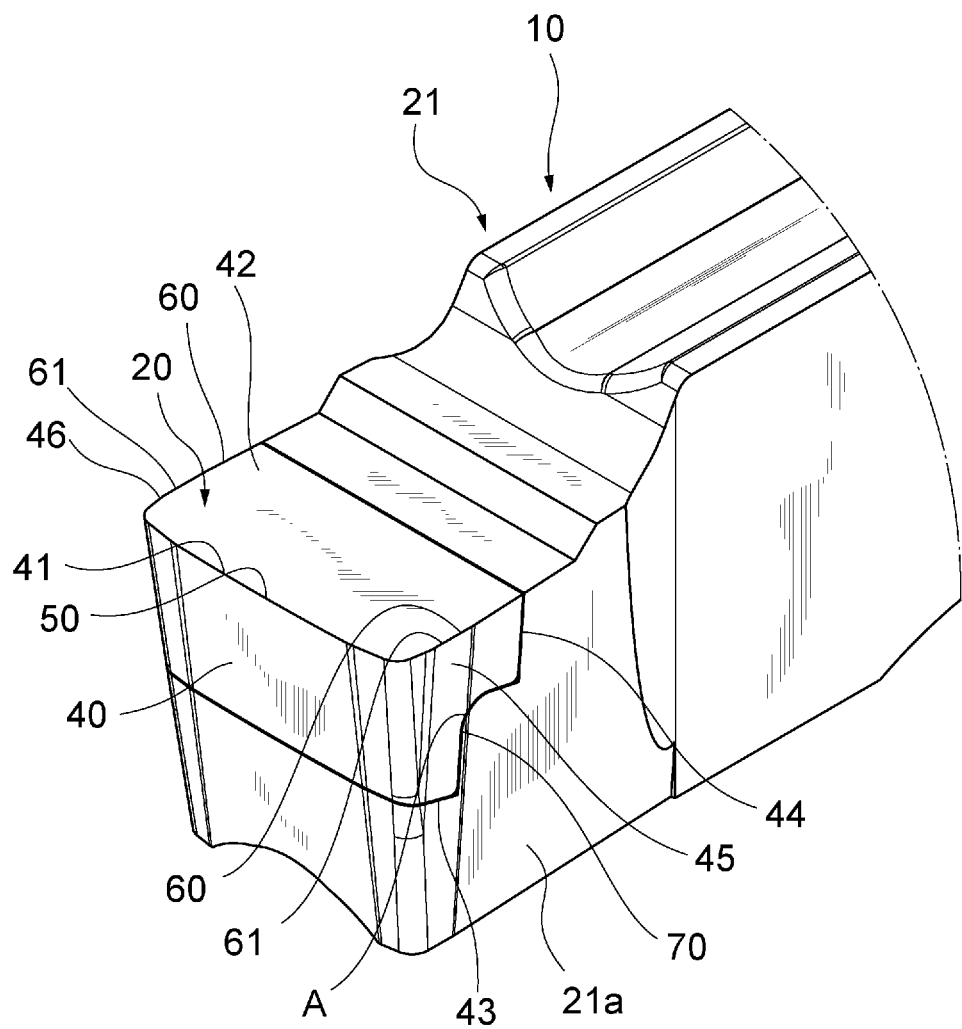
FIG. 3 is an enlarged view of a leading end part of the cutting insert.
Figure 3:
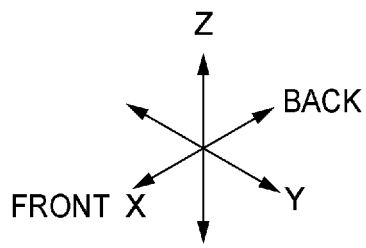
Figure 4:
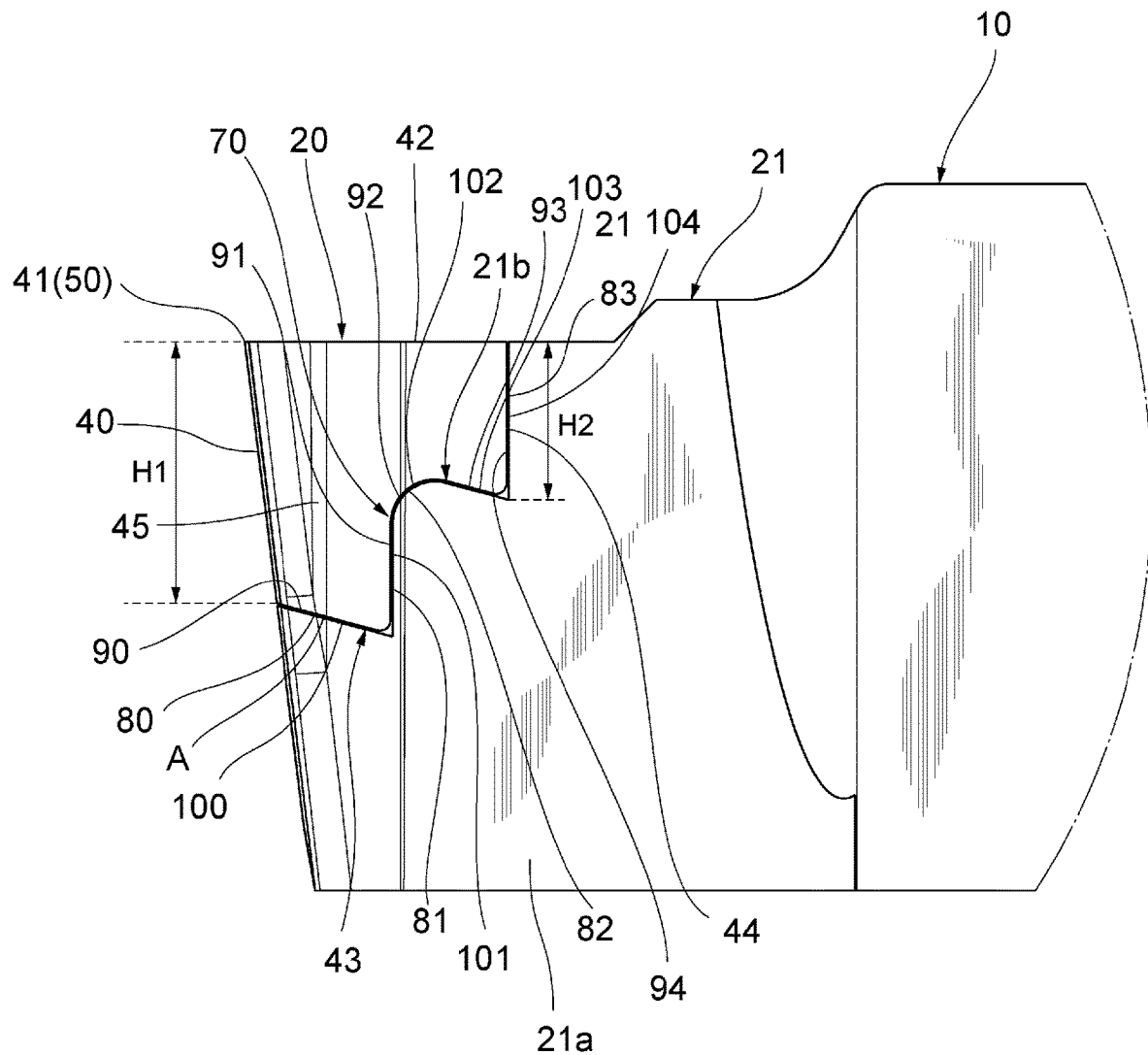
FIG. 4 is a side view of the leading end part of the cutting insert.
Figure 5:
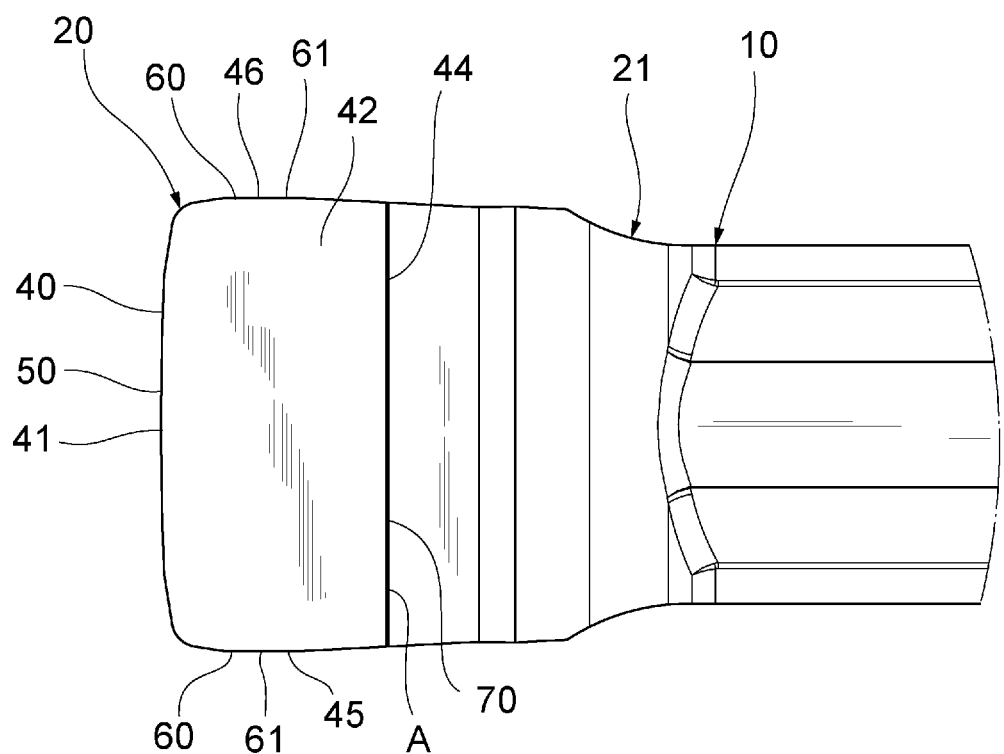
FIG. 5 is a top plan view of the leading end part of the cutting insert.
Figure 5:
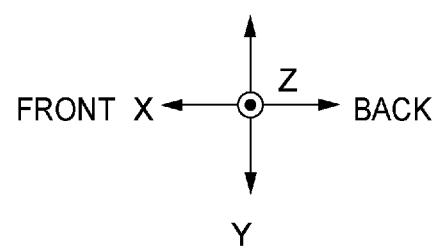
Figure 6:
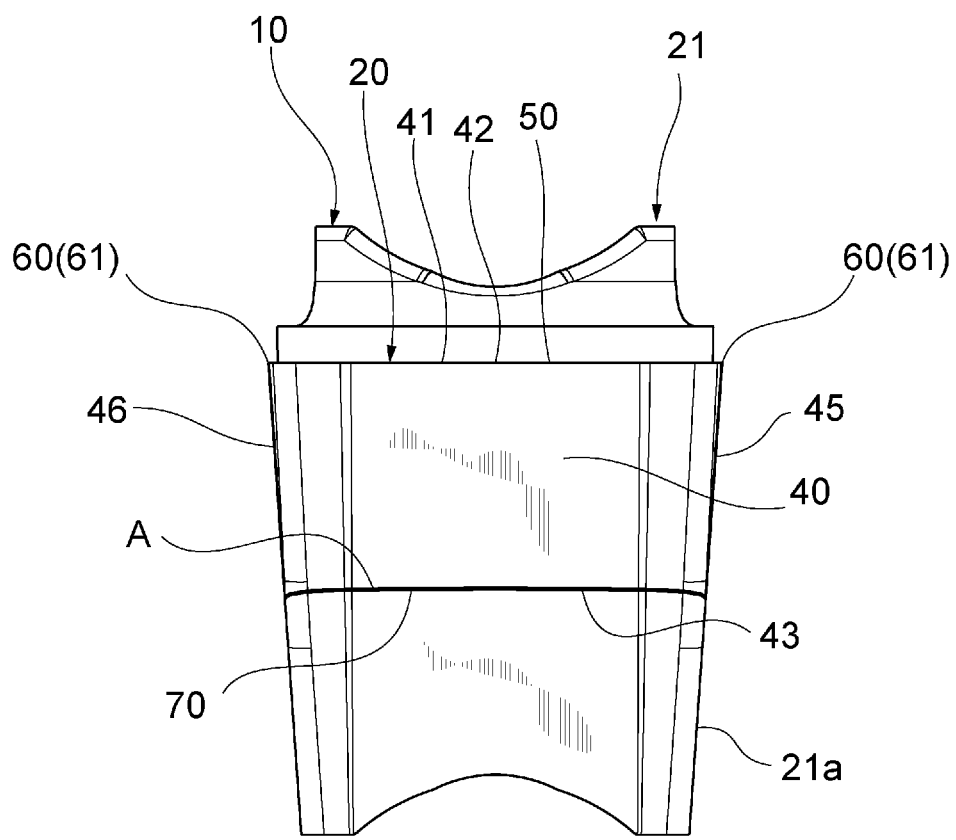
FIG. 6 is a front view of the leading end part of the cutting insert.
Figure 6:
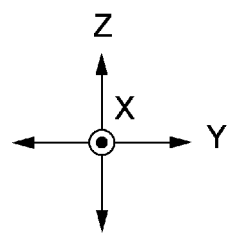

FIG. 2 is a perspective view of the cutting insert 10 according to the embodiment, and FIG. 3 is an enlarged view of a leading end part of the cutting insert 10. FIG. 4 is a side view of the leading end part of the cutting insert 10, FIG. 5 is a top plan view of the leading end part of the cutting insert 10, and FIG. 6 is a front view of the leading end part of the cutting insert 10. Herein, one side in the longitudinal direction of the cutting insert 10 where there is the cutting edge shall be called "leading side," and the opposite side shall be called "trailing side." The longitudinal direction of the cutting insert 10 shall be called "front-back direction x," and a direction perpendicular to this front-back direction x and parallel to an upper surface 42, to be described later, of the cutting insert 10, shall be called "left and right direction Y." A direction perpendicular to the upper surface 42 of the cutting insert 10 shall be called "up and down direction Z."

As shown in FIG. 2, the cutting insert 10 as a whole substantially has a long rectangular parallelepiped shape. The cutting insert 10 includes a sintered body 20 having the cutting edge, and a base body 21 to which the sintered body 20 is joined. The sintered body 20 is joined to the base body 21 with a braze material A that is a joint material.

The base body 21 has a shape elongated in the front-back direction X, with the sintered body 20 joined to a leading end 21a of the base body.

The sintered body 20 is for example a CBN (cubic boron nitride) sintered body or a diamond sintered body. As shown in FIG. 3, the sintered body 20 is a solid that is substantially a hexahedron with a stepped part at the bottom. The sintered body 20 includes, for example, a front surface 40 on the leading side, an upper surface 42 connected to this front surface 40 and forming a connecting edge 41 with the front surface 40, a bottom surface 43 opposite the upper surface 42, a back surface 44 opposite the front surface 40, and two side surfaces 45 and 46 opposite each other and connected to the front surface 40, upper surface 42, bottom surface 43, and back surface 44.

The front surface 40 is substantially quadrilateral in front elevation view shown in FIG. 6. The front surface 40 in side view, as shown in FIG. 4, is inclined to the up and down direction Z so that the front surface gradually retreats backward from the upper surface 42 toward the bottom surface 43 (downward).

The upper surface 42 is substantially quadrilateral in top plan view shown in FIG. 5. Between the upper surface 42 and the front surface 40 is formed a linear connecting edge 41, this connecting edge 41 being the cutting edge 50. The cutting edge 50 is slightly curved backward near both ends in top plan view. The upper surface 42 is a rake surface. The upper surface 42 gradually reduces in width in the left and right direction Y from the leading end toward the trailing side.

As shown in FIG. 3, the side surfaces 45 and 46 form connecting edges 60 with the upper surface 42, these connecting edges 60 also being side cutting edges 61. The side surfaces 45 and 46 in front view, as shown in FIG. 6, are inclined to the up and down direction Z toward the center of the left and right direction Y from the upper surface 42 toward the bottom surface 43 (downward).

As shown in FIG. 4, the sintered body 20 joins to the base body 21 on the bottom surface 43 and the back surface 44 and forms a joint surface 70 in these parts.

Figure 7:
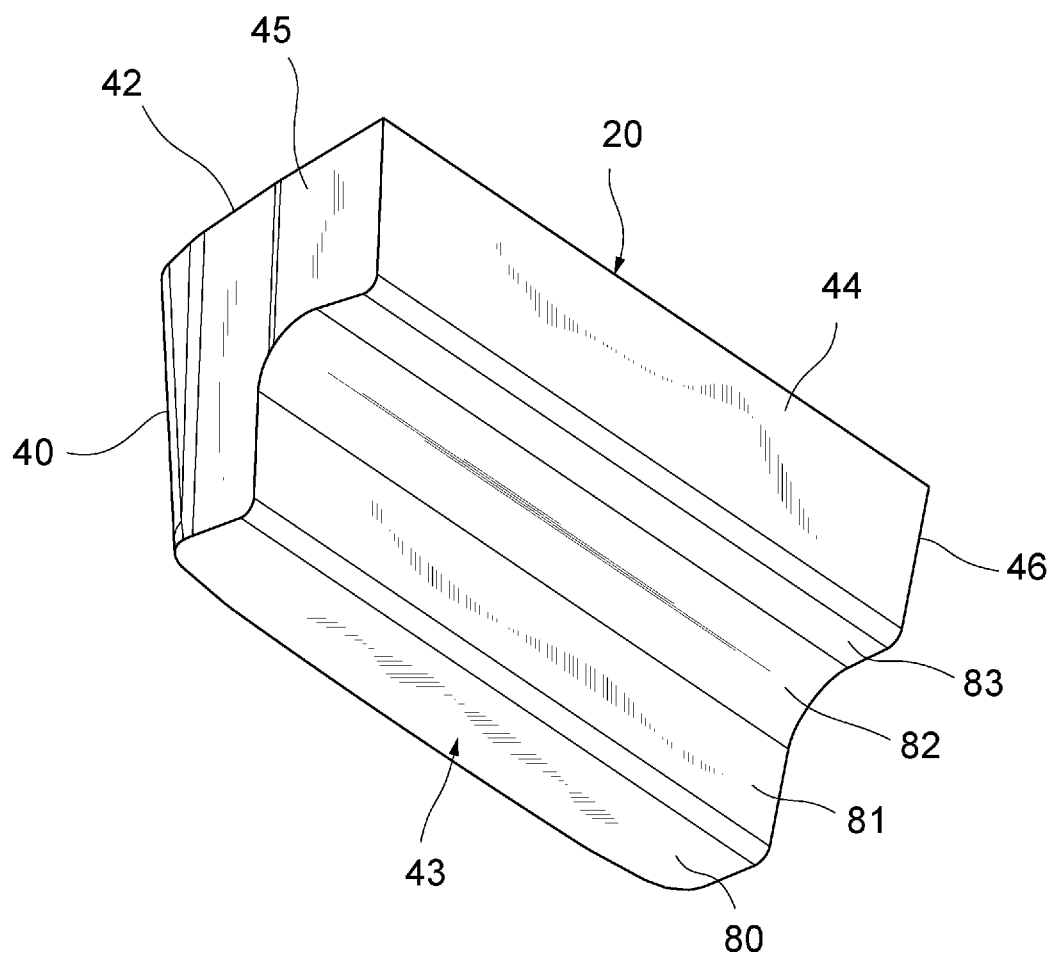
FIG. 7 is a perspective view of a sintered body.
Figure 7:
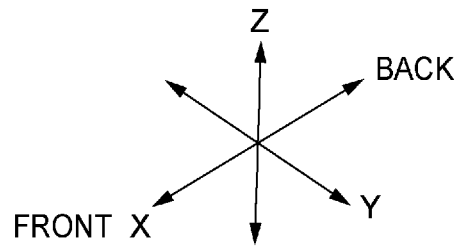

The bottom surface 43 and back surface 44 in side view, as shown in FIG. 4, configure a step-like shape, with the leading side being lower than the trailing side. The bottom surface 43 includes, as shown in FIG. 4 and FIG. 7 for example, a first flat surface 80, a first erected surface 81, an intermediate surface 82, and a second flat surface 83 in this order from the leading side toward the trailing side. The first flat surface 80 and first erected surface 81 are connected to each other, the first erected surface 81 and intermediate surface 82 are connected to each other, and the intermediate surface 82 and second flat surface 83 are connected to each other. The second flat surface 83 of the bottom surface 43 is connected to the back surface 44.

As shown in FIG. 7, the first flat surface 80, first erected surface 81, and second flat surface 83 each have a rectangular shape elongated in the left and right direction Y. As shown in FIG. 4, the first flat surface 80 and second flat surface 83 are inclined such that the trailing side is lower than the leading side. Namely, the first flat surface 80 and second flat surface 83 are angled from the upper surface 42. The intermediate surface 82 is curved in a circular arc and recessed toward the upper surface 42. The first erected surface 81 is slightly inclined to the up and down direction Z upward toward the back surface 44.

As shown in FIG. 7, the back surface 44 has a rectangular shape elongated in the left and right direction Y. The back surface 44, although not clear from FIG. 4, is slightly inclined to the up and down direction Z downward toward the front surface 40. The back surface 44 may instead be perpendicular to the upper surface 42.

Figure 8:
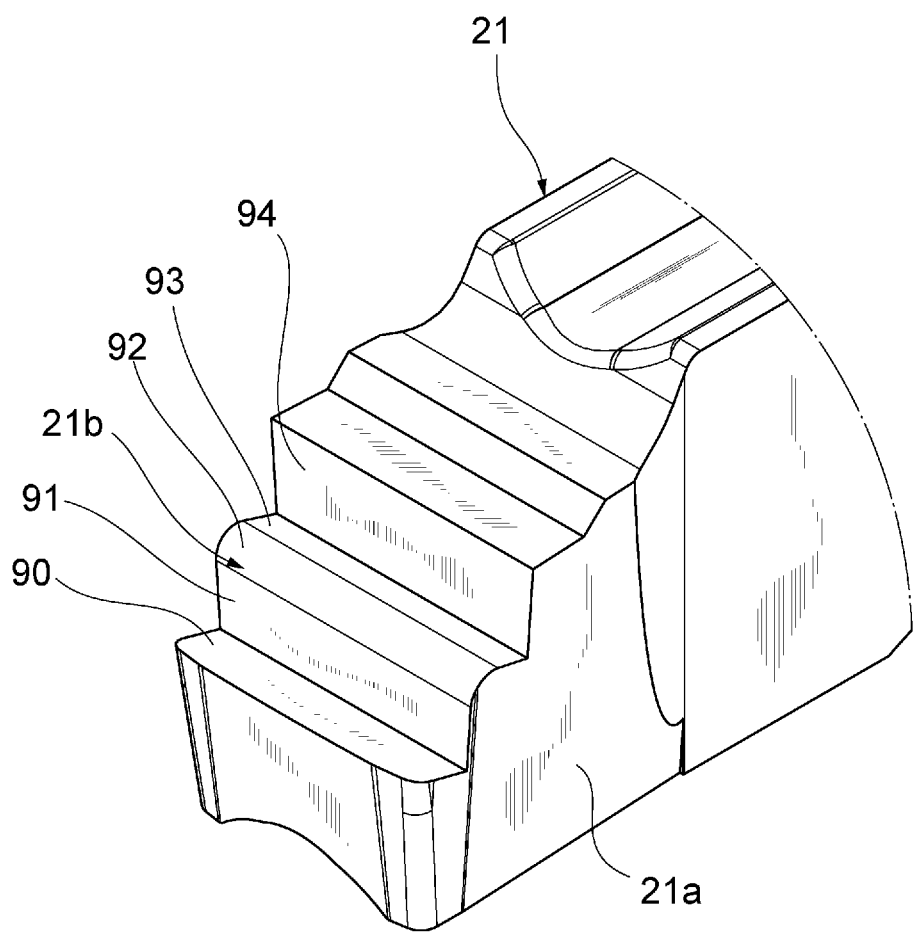
FIG. 8 is a perspective view of a leading end of a base body.
Figure 8:
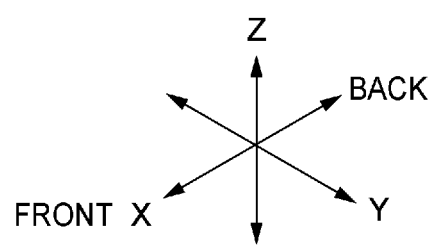

As shown in FIG. 8, the leading end 21a of the base body 21 has an upper surface 21b where the sintered body 20 is placed and joined. The upper surface 21b has a step-like shape with the leading side being lower than the trailing side, corresponding to the step-like shape formed by the bottom surface 43 and back surface 44 of the sintered body 20.

The upper surface 21b of the base body 21 includes a first flat surface 90, a first erected surface 91, an intermediate surface 92, a second flat surface 93, and a second erected surface 94 in this order from the leading side toward the trailing side. The first flat surface 90 and first erected surface 91 are connected to each other, the first erected surface 91 and intermediate surface 92 are connected to each other, the intermediate surface 92 and second flat surface 93 are connected to each other, and the second flat surface 93 and second erected surface 94 are connected to each other.

The first flat surface 90, first erected surface 91, second flat surface 93, and second erected surface 94 each have a rectangular shape elongated in the left and right direction Y. The first flat surface 90 and second flat surface 93 are inclined such that the trailing side is lower than the leading side. The intermediate surface 92 is curved in a circular arc and projected upward. The first erected surface 91 and second erected surface 94 are slightly inclined to the up and down direction Z upward and backward.

The joint surface 70 between the sintered body 20 and the base body 21 is made up of joints between the first flat surface 80 of the sintered body 20 and the first flat surface 90 of the base body 21 respectively shown in FIG. 7 and FIG. 8, between the first erected surface 81 of the sintered body 20 and the first erected surface 91 of the base body 21, between the intermediate surface 82 of the sintered body 20 and the intermediate surface 92 of the base body 21, between the second flat surface 83 of the sintered body 20 and the second flat surface 93 of the base body 21, and between the back surface 44 of the sintered body 20 and the second erected surface 94 of the base body 21, these joints being united via the braze material A.

Namely, the joint surface 70 has a step-like shape, with the leading side being lower than the trailing side, and includes, in side view shown in FIG. 4, a first flat joint surface 100 extending from the leading side toward the trailing side, a first erected joint surface 101 connected to the first flat joint surface 100 and extending upward, an intermediate joint surface 102 connected to the first erected joint surface 101, a second flat joint surface 103 connected to the intermediate joint surface 102 and extending from the leading side toward the trailing side, and a second erected joint surface 104 connected to the second flat joint surface 103 and extending upward. A "step-like shape" herein refers to a shape having two or more steps (flat joint surfaces).

The first flat joint surface 100 and second flat joint surface 103 are inclined such that the trailing side is lower than the leading side. The first flat joint surface 100 has a length that is for example equal to, or longer than, that of the second flat joint surface 103 in the front-back direction X.

The intermediate joint surface 102 is curved in a circular arc and projected upward. The first erected joint surface 101 and second erected joint surface 104 are slightly inclined to the up and down direction Z upward and backward.

The sintered body 20 in the front surface 40 has a height H1 that is 110% or more, preferably 120% or more and 400% or less, and more preferably 150% or more and 300% or less, of a height H2 in the back surface 44.

According to this embodiment, the joint surface 70 between the sintered body 20 and the base body 21 has a step-like shape, because of which the leading side of the joint surface 70 (braze material A closer to the front surface 40 of the sintered body 20), where the temperature becomes relatively high during the cutting by the cutting edge 50, is located away from the cutting edge 50. This can minimize the thermal softening of the braze material A on the joint surface 70. In parting-off and grooving applications, in particular, the highest temperature during the machining is observed at the cutting edge 50 on the front surface. Therefore, the leading side of the joint surface 70 being away from the cutting edge 50 effectively minimizes the softening of the braze material A on the joint surface 70. The step-like shape also enables an increase in the joint area of the joint surface 70 between the sintered body 20 and the base body 21, which enhances the brazing strength. This can minimize fracture of the sintered body 20 from the base body 21. The trailing side of the joint surface 70 being closer to the upper surface 42 of the sintered body 20 means that the sintered body 20 is thinner on the side closer to the back surface 44. This enables a reduction in the amount of material used for the sintered body 20 and leads to size reduction of the sintered body 20. Thus the cost for the cutting insert 10 can be reduced.

Additionally, the step-like shape provides the following effect. In a joint without the step-like shape, for example, an effective area of brazed joint would be mainly that of a flat joint surface, and an erected joint surface would only be complementary. A step-like shape, in contrast, allows part of the erected joint surface to account for the brazing area equally to the flat joint surface. Namely, the sintered body 20 converts part of the joint area in the front-back direction X to a joint area in the up and down direction Z, which allows the length in the front-back direction X, i.e., the volume, to be significantly reduced, compared to a sintered body having a thickness of H1 and a linear joint surface instead of a stepped one.

Since the first flat joint surface 100 and second flat joint surface 103 of the joint surface 70 are inclined such that the trailing side is lower than the leading side, the joint area of the joint surface 70 between the sintered body 20 and the base body 21 is increased even more, which enhances the brazing strength. The inclination also makes it easier for the sintered body 20 and the base body 21 to engage each other, which also enhances the brazing strength.

The first flat joint surface 100 on the leading side has a length that is equal to, or longer than, that of the second flat joint surface 103 on the trailing side in the front-back direction X. Since the first flat joint surface 100 on the leading side, which is subjected to a larger load during cutting, has a larger joint area, the brazing strength is increased.

The intermediate joint surface 102 in side view is upwardly projected and curved so that the joint area of the joint surface 70 between the sintered body 20 and the base body 21 is further increased, which enhances the brazing strength.

The sintered body 20 in the front surface 40 has a height H1 that is 110% or more than the height H2 in the back surface 44, which makes the trailing side of the joint surface 70 closer enough to the upper surface 42 of the sintered body 20, i.e., makes the sintered body 20 thin enough, to achieve size reduction of the sintered body 20.

Figure 9:
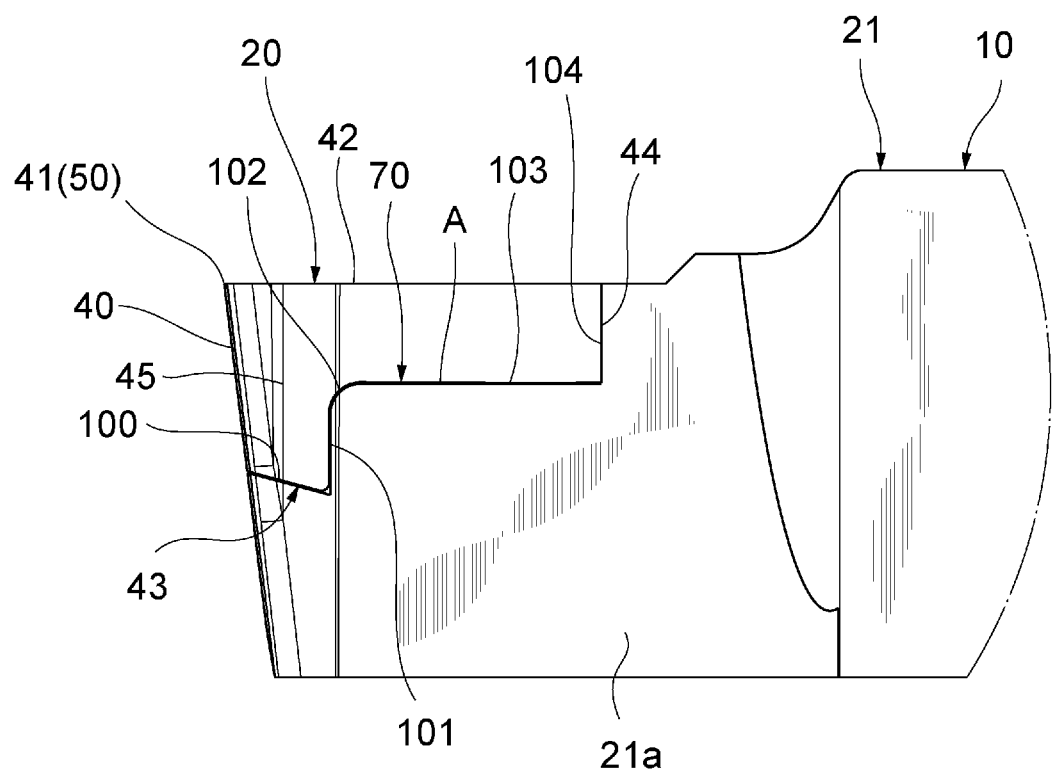
FIG. 9 is a side view of a leading end part of a cutting insert in a case where a second flat joint surface is longer than a first flat joint surface.
Figure 9:
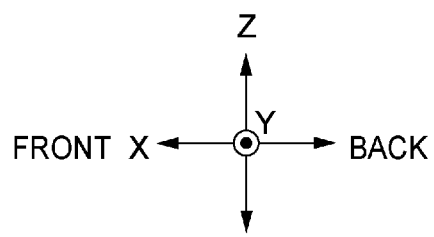

In the embodiment described above, the first flat joint surface 100 on the leading side is longer than the second flat joint surface 103 on the trailing side. Instead, as shown in FIG. 9, the second flat joint surface 103 on the trailing side may be longer than the first flat joint surface 100 on the leading side. This configuration increases the joint area of the joint surface 70 between the sintered body 20 and the base body 21 and consequently enhances the brazing strength. The second flat joint surface 103 in this case may be 1.5 times or more longer than the first flat joint surface 100.

Figure 10:
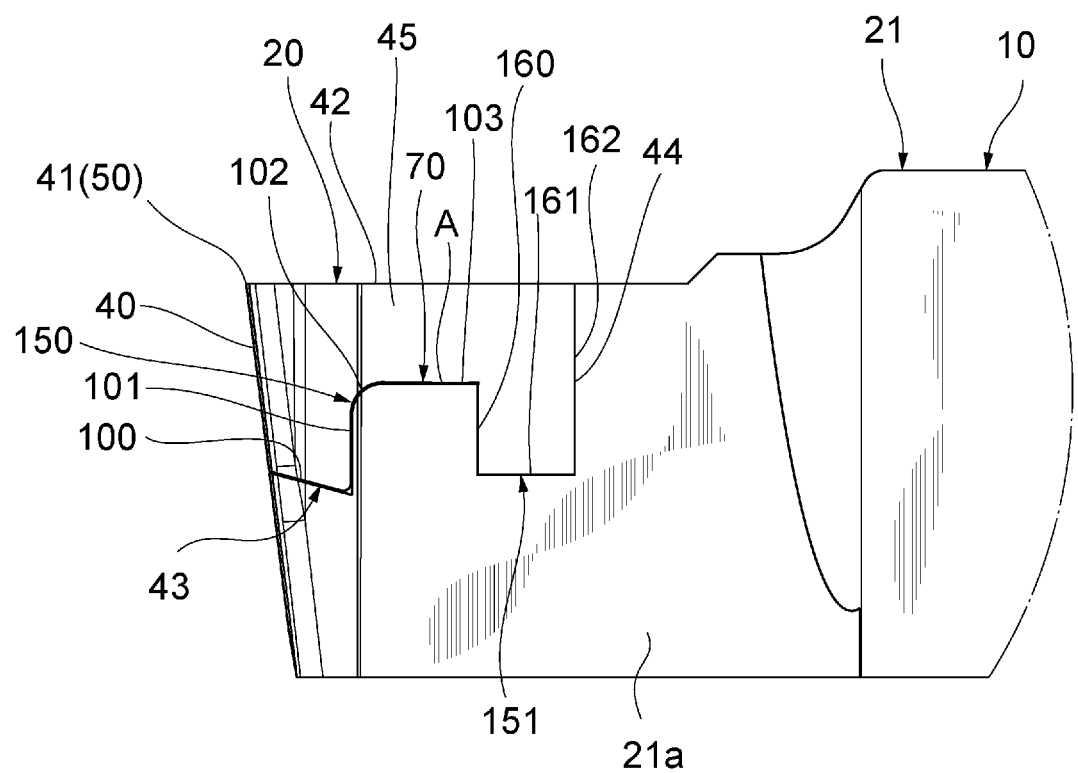
FIG. 10 is a side view of a leading end part of a cutting insert in a case where the joint surface has a downwardly projecting shape.
Figure 10:
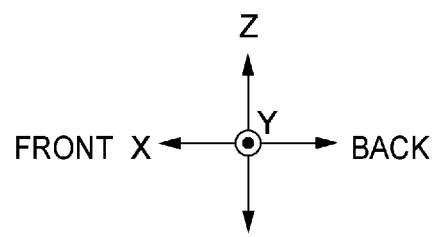

The joint surface 70 in side view may further include a downwardly projecting shape behind the step-like shape as shown in FIG. 10. In this case, the joint surface 70 may have a step-shaped part 150 made up of a first flat joint surface 100, a first erected joint surface 101, an intermediate joint surface 102, and a second flat joint surface 103, and, behind the step-shaped part, a downwardly projecting shape 151 made up of a second erected joint surface 160, a third flat joint surface 161, and a third erected joint surface 162. This configuration further increases the joint area of the joint surface 70 between the sintered body 20 and the base body 21 and consequently enhances the brazing strength. Since the sintered body 20 and the base body 21 engage each other, the brazing strength is increased in this respect, too.

Figure 11:
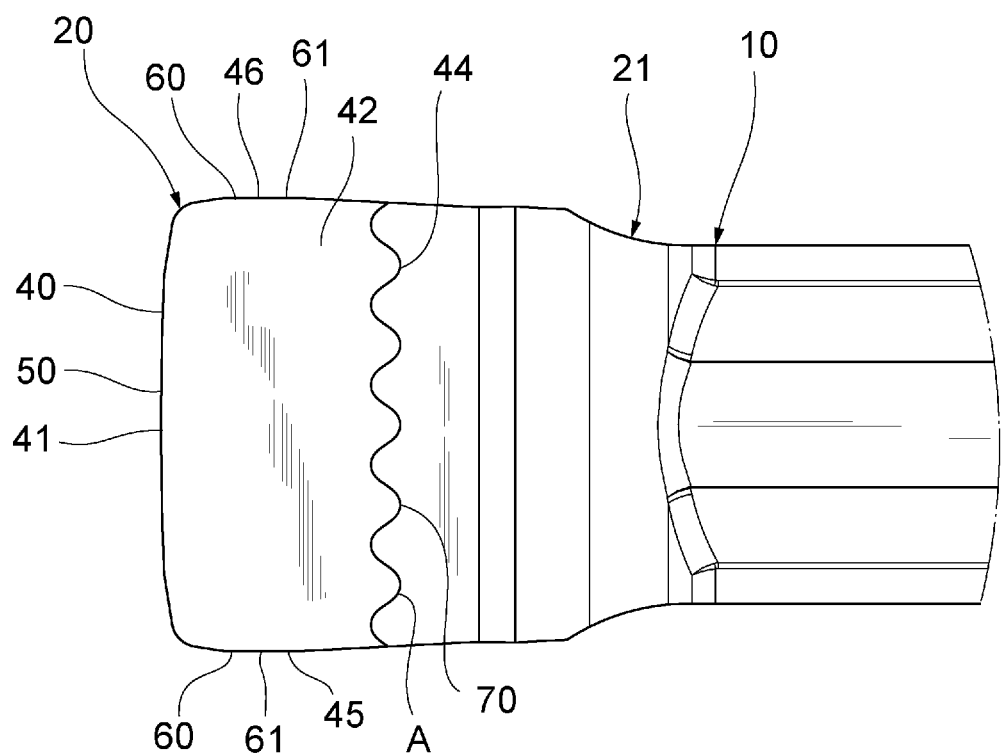
FIG. 11 is a top plan view of a leading end part of a cutting insert in a case where the joint surface has a corrugated rear end face.
Figure 11:
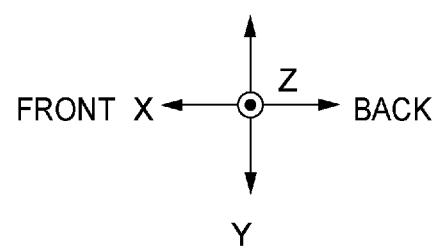

The joint surface 70 may have a corrugated second erected joint surface 104, which is the rear end face in top plan view as shown in FIG. 11. In this case, for example, the back surface 44 of the sintered body 20 and a second erected surface 94 of the base body 21 are corrugated. This configuration further increases the joint area of the joint surface 70 between the sintered body 20 and the base body 21 and consequently enhances the brazing strength.

While a preferred embodiment of the present invention has been described with reference to the accompanying drawings, the present invention is not limited to this example. Various modifications or alterations a person skilled in the art could obviously conceive within the scope set forth in the claims are naturally understood to belong to the technical scope of the present invention.

In the embodiment described above, the joint surface 70 may have any other shape as long as it includes steps in side view. The first flat joint surface 100 and second flat joint surface 103 may be horizontal to the upper surface 42 instead of being inclined. The first erected joint surface 101 and second erected joint surface 104 may be perpendicular to the upper surface 42. The intermediate joint surface 102 may not be curved in a circular arc. The intermediate joint surface 102 may be omitted, and the first erected joint surface 101 and second flat joint surface 103 may be directly connected to each other.

The step-like shape of the joint surface 70 may have any number of steps (flat joint surfaces), i.e., not only two as in the embodiment described above but also three or more. The shapes of sintered body 20 and base body 21 are not limited to those of the embodiment described above.

The cutting insert 10 described in the above embodiment is not limited to grooving applications but may be used for external turning, face turning, copy machining, internal turning, and so on.

The present invention is useful in providing a cutting insert and a cutting tool with a high chip control both in grooving and turning applications.

What is claimed is:

1. A cutting insert comprising:
a sintered body having a cutting edge; and
a base body having a leading end where the sintered body is joined to the base body via a joint material,
the sintered body including
a front surface on a leading side of the sintered body,
an upper surface connected to the front surface with the cutting edge being formed along a connecting edge between the upper surface and the front surface,
a bottom surface opposite the upper surface,
a back surface opposite the front surface, and
two side surfaces connected to the front surface, the upper surface, the bottom surface, and the back surface,
the sintered body and the base body being joined together in a joint surface that includes the bottom surface and the back surface of the sintered body,
the joint surface in side view having a step-like shape, with a leading side thereof being lower than a trailing side thereof,
wherein the joint surface includes a plurality of flat joint surfaces extending from the leading side to the trailing side of the joint surface, and a plurality of erected joint surfaces extending upward,
the flat joint surfaces and the erected joint surfaces alternate from the leading side to the trailing side of the joint surface, and
the flat joint surfaces in side view are inclined such that a trailing side thereof is lower than a leading side thereof.

2. The cutting insert according to claim 1, wherein the plurality of flat joint surfaces include a first flat joint surface located on the leading side thereof and a second flat joint surface located on the trailing side thereof, the first flat joint surface having a length equal to, or longer than, that of the second flat joint surface in a front-back direction.

3. The cutting insert according to claim 1, wherein the plurality of flat joint surfaces include a first flat joint surface located on the leading side thereof and a second flat joint surface located on the trailing side thereof, the second flat joint surface having a length longer than that of the first flat joint surface.

4. The cutting insert according to claim 1, wherein
the joint surface includes an intermediate joint surface connecting the flat joint surface and the erected joint surface, and
the intermediate joint surface in side view is upwardly convexly curved.

5. The cutting insert according to claim 1, wherein the sintered body in side view has a height in the front surface that is 110% or more of a height in the back surface.

6. The cutting insert according to claim 1, wherein the joint surface in side view further includes a downwardly projecting shape behind the step-like shape.

* * * * *